(12) United States Patent
Leidig et al.

(10) Patent No.: US 10,968,938 B2
(45) Date of Patent: Apr. 6, 2021

(54) CONNECTOR WITH ENHANCED MOUNTING PROCESS

(71) Applicant: ILLINOIS TOOL WORKS INC., Glenview, IL (US)

(72) Inventors: Christoph Leidig, Rothenburg (DE); Jan Müller, Westheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 194 days.

(21) Appl. No.: 16/160,087

(22) Filed: Oct. 15, 2018

(65) Prior Publication Data
US 2019/0136894 A1   May 9, 2019

(30) Foreign Application Priority Data

Nov. 3, 2017   (DE) ...................... 10 2017 125 722.5
Jan. 4, 2018   (DE) ...................... 10 2018 100 147.9

(51) Int. Cl.
| | |
|---|---|
| F16B 21/00 | (2006.01) |
| F16B 21/02 | (2006.01) |
| F16B 21/08 | (2006.01) |
| F16B 21/04 | (2006.01) |
| F16B 5/06 | (2006.01) |

(52) U.S. Cl.
CPC ............ *F16B 21/02* (2013.01); *F16B 5/0621* (2013.01); *F16B 21/04* (2013.01); *F16B 21/086* (2013.01); *F16B 5/065* (2013.01); *F16B 5/0664* (2013.01)

(58) Field of Classification Search
CPC ...................................................... F16B 21/04
USPC .......................................................... 411/349
See application file for complete search history.

(56) References Cited

U.S. PATENT DOCUMENTS

| | | | | |
|---|---|---|---|---|
| 3,480,311 A |  | 11/1969 | Lanham | |
| 3,744,101 A | * | 7/1973 | Gley | F16B 21/02 24/453 |
| 3,776,649 A | * | 12/1973 | Kemezys | F16C 11/069 403/90 |
| 4,145,862 A | * | 3/1979 | Sygnator | F16B 5/10 411/349 |

(Continued)

FOREIGN PATENT DOCUMENTS

| | | |
|---|---|---|
| DE | 9311243 U1 | 9/1993 |
| WO | WO 2008/101531 | 8/2008 |

*Primary Examiner* — Gary W Estremsky
(74) *Attorney, Agent, or Firm* — Thompson Hine LLP

(57) ABSTRACT

A connector (1) for fastening a first component (100) to a second component (200) of a motor vehicle, includes a bearing collar (10) for bearing against the first component (100), a crossbar (20) having one or more upper bearing surfaces (21.1, 21.2) for bearing against the second component (200) and for bracing the second component (200) against the first component (100) in a rotated final assembly position, a shaft portion (30) for passing through corresponding apertures (110, 210) in the components (100, 200), and fastening means (40) for fastening the connector (1) to the first component (100) in a preassembly position. A rotation-blocking device (50) is configured to block rotation of the connector (1) in relation to the first component (100) in the preassembly position and only to release said rotation when the connector (1) has moved from the preassembly position in the direction of the final assembly position.

18 Claims, 4 Drawing Sheets

(56) References Cited

U.S. PATENT DOCUMENTS

| | | | | |
|---|---|---|---|---|
| 4,762,437 | A | * | 8/1988 | Mitomi ................... F16B 21/02 24/297 |
| 5,123,795 | A | * | 6/1992 | Engel ...................... F16B 21/02 411/552 |
| 8,221,041 | B2 | * | 7/2012 | Hauser ...................... F16B 5/10 411/349 |
| 8,262,333 | B2 | * | 9/2012 | Bucker ................. F16B 21/086 411/349 |
| 8,657,545 | B2 | * | 2/2014 | Magno, Jr. .............. F16B 7/187 248/214 |
| 2002/0021950 | A1 | * | 2/2002 | Ichikawa .............. F16B 5/0642 411/349 |
| 2012/0131774 | A1 | * | 5/2012 | Takahashi .............. B60K 15/05 24/611 |
| 2012/0272540 | A1 | | 11/2012 | Ornelaz, Jr. |
| 2018/0231036 | A1 | * | 8/2018 | Baumeister ............. F16B 2/243 |
| 2019/0118731 | A1 | * | 4/2019 | Leverger ................ B60J 5/0416 |

* cited by examiner

CONNECTOR WITH ENHANCED MOUNTING PROCESS

TECHNICAL FIELD

The invention relates in general to connectors.

BACKGROUND

The prior art U.S. Pat. No. 3,480,311, WO 2008/101531 A1 and U.S. Pat. No. 5,123,795—in each case disclose a connector for mechanically connecting at least two components, having a bearing collar and a crossbar and means for fastening to one of the components in a defined preassembly position.

The inventors have found it disadvantageous that the assembly sequence associated with said connectors involves the risk of erroneous assembly.

SUMMARY

The object on which the invention is based was to improve the above-noted disadvantage. The object is achieved by the invention, in particular as defined in the independent claims.

In particular, this object is achieved by a connector, wherein the connector is configured to fasten a first component, preferably a door module, to a second component, preferably a door, of a motor vehicle, wherein the connector has a bearing collar for bearing against an upper side of the first component,
a crossbar having one or more upper bearing surfaces for bearing against a lower side of the second component and for bracing the second component against a lower bearing surface of the first component in a rotated final assembly position,
a shaft portion which supports the crossbar and is oriented in the axial direction, for passing through corresponding apertures in the components, and
fastening means for fastening the connector to the first component in a preassembly position,
wherein, in addition to the crossbar, the connector has a rotation-blocking device which is arranged between the crossbar and the bearing collar and is configured to block rotation of the connector in relation to the first component in the preassembly position and only to release said rotation when the connector has moved from the preassembly position in the direction of the final assembly position, i.e. has preferably pushed further axially into the aperture of the first component.

In particular, this object is furthermore achieved by an assembly, wherein the assembly comprises a first component and a connector, which is mounted on the first component in the preassembly position, according to the invention.

The effect achieved by this is that the connector cannot already be rotated when the connector is not or is no longer prevented by the first component from rotation because of the crossbar, but rather only when the crossbar is removed by a certain distance from the first component. This reduces the probability of erroneous assembly in which the user already rotates the connector when the crossbar is not yet located in the aperture of the second component.

In the final assembly position, the connector is rotated in relation to the first and second component preferably by an angle within the range of 10° and 170°, particularly preferably by 90° in comparison to the preassembly position.

The use of "upper" and "lower" relates merely to the relative position of the corresponding parts with respect to each other, and has been selected such as is shown in the figures. However, such a compulsory orientation of the connector in space is not associated therewith.

The connector is preferably produced integrally, preferably from plastic, by means of an injection molding process.

In the case of a further connector according to the invention, it is provided that the rotation-blocking device is configured to only release the rotation of the connector in relation to the first component when one or more upper bearing surfaces of the crossbar are arranged spaced apart at a certain axial minimum distance of at least the material thickness of the second component or of at least 0.7 mm in relation to the lower bearing surface of the first component.

The effect achieved by this is that the connector has to be moved axially in the direction of the final position to an extent such that the second component would pass 0.7 mm between the upper bearing surfaces of the crossbar and the lower bearing surface of the first component. If the user has then brought the first component and the second component into contact with each other, the user theoretically cannot do anything else wrong.

The aperture of the second component preferably has one or more radial indentations (in comparison to a circle); the aperture is preferably rectangular.

In the case of a further connector according to the invention, it is provided that the rotation-blocking device has one or more, preferably two, preferably opposite, preferably diametrically opposite, radially outwardly directed projections as blocking lugs on the shaft portion.

An advantageous realization of the rotation-blocking device is thereby provided.

The blocking lugs are preferably arranged axially between the crossbar and the bearing collar.

This provides an advantageous realization for spacing the crossbar axially away from the aperture of the first component and at the same time for ensuring blocking of the possibility of rotation.

In the case of a further connector according to the invention, it is provided that the fastening means have at least one radially outwardly protruding upper latching projection and at least one radially outwardly protruding lower latching projection which is spaced apart axially therefrom, wherein the two latching projections are arranged between the bearing collar and the crossbar, and wherein the one or more blocking lugs are at least partially arranged axially between the upper latching projection and the lower latching projection.

By this means, the first component is pre-latchable between the upper and lower latching projection/latching projections in the preassembly position, and therefore the blocking lugs come to lie at least partially in the aperture of the first component in order to be able to bring about their rotation-blocking function by stopping in the aperture in the tangential direction.

The fastening means preferably have two upper and two lower latching projections.

In the case of a further connector according to the invention, it is provided that the upper latching projection and the lower latching projection are arranged on a substantially axially oriented skirt connected flexibly to the bearing collar or to the shaft portion.

This makes it easier to take up the pre-latching state and to leave the pre-latching state in the direction of the final assembly position since the skirt yields flexibly when the latching projections pass the aperture of the first component.

The fastening means preferably have two such skirts, wherein the latter lie opposite each other, preferably diametrically opposite each other.

In the case of a further connector according to the invention, it is provided that the connector has at least two such skirts, wherein the skirts are curved in the shape of a cylinder jacket on their radially outer side, and the two skirts lie on the same imaginary cylinder jacket, preferably lying opposite each other, particularly preferably lying diametrically opposite each other, and wherein the blocking lugs are each arranged in the tangential direction between the skirts.

The skirts are thereby configured to serve as a rotational guide.

When the connector is in assembly with the first component in the preassembly position, the skirts preferably lie within the aperture of the first component against the inner edge of the aperture, in a region at which the aperture is circular, and they therefore serve as a rotational guide.

In the case of a further assembly according to the invention, it is provided that the first component has an aperture at which the connector is mounted by means of the fastening means, wherein the aperture is circular in sections and has one or more radial indentations or bulges with which the rotation-blocking device of the connector is in contact or comes into contact in order to block the rotation of the connector in relation to the first component in the preassembly position.

Rotation of the connector in relation to the first component is thereby blocked by interaction of the rotation-blocking device and the geometry of the aperture in the preassembly position.

The blocking lugs preferably each lie against an indentation of the aperture, and therefore the indentation forms a tangential stop for the blocking lug.

One or more blocking lugs are preferably delimited on both sides by an indentation in the preassembly position.

The rotational movement of the connector in relation to the first component is particularly preferably limited in the preassembly position in one direction by the blocking lug lying against an indentation, and in the other direction by a fastening means, e.g. one of the skirts.

In the case of a further assembly according to the invention, it is provided that the connector has, on a radial outer wall of the crossbar, a radial projection or a radial recess, and that the aperture in the first component has a corresponding radial recess or a corresponding radial projection such that the angular positions at which the crossbar is insertable into the aperture of the first component are limited to at maximum two angular positions, preferably one angular position. This prevents erroneous insertion.

In the case of a further assembly according to the invention, it is provided that the component has, outside the aperture, a collar adjoining the aperture or one or more spacers on a lower side of the first component, wherein the axial lower end surfaces of the collar or of the one or more spacers constitute the lower stop surface of the first component.

This creates a clearance between the first component and second component, said clearance providing a space for the fastening means and the rotation-blocking device in the final assembly position.

In the case of a further assembly according to the invention, it is provided that the assembly is fastened to the second component, and the connector is guided through the aperture of the second component and is rotated into the final assembly position such that the crossbar is hooked behind a radial indentation of the aperture of the second component, wherein an axial distance between firstly the upper bearing surfaces or, if present, that point of upper ramp surfaces of the crossbar which is furthest away from the bearing collar, and secondly an axial upper end of the blocking lugs is equal to or greater, preferably 0.5-1.5 mm greater, than the sum of the height of the collar or of one or more spacers and a thickness of the second component at the aperture of the second component.

By this means, it is possible only to rotate the connector with respect to the first and second component when the connector has been pressed in axially to an extent such that the crossbar hooks behind the aperture of the second component.

BRIEF DESCRIPTION OF THE DRAWINGS

The invention will now be illustrated further by way of example with reference to drawings, in which.

DETAILED DESCRIPTION

Figure 1A:
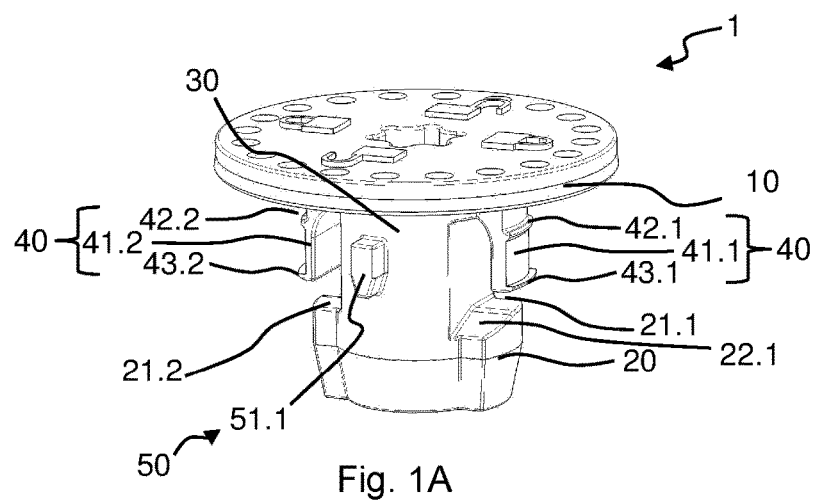
FIGS. 1A-1C show a connector according to the invention in a perspective view (FIG. 1A) and in side views each offset by 90° (FIGS. 1B, 1C)
Figure 1B:
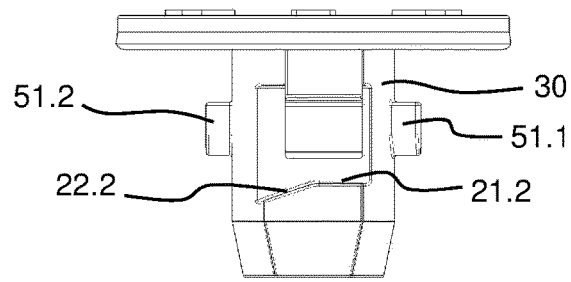
Figure 1C:
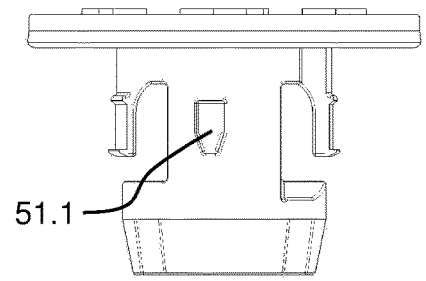

FIGS. 1A-1C show a connector according to the invention in a perspective view (FIG. 1A) and side views each offset by 90° (FIGS. 1B, 1C). The configuration is such that the connector 1 is configured to fasten a first component 100, here a door module, to a second component 200, here a door, of a motor vehicle, wherein the connector 1 has
- a bearing collar 10 for bearing against an upper side 120 of the first component 100,
- a crossbar 20 having one or more upper bearing surfaces 21.1, 21.2 for bearing against a lower side 220 of the second component 200 and for bracing the second component 200 against a lower bearing surface 130 of the first component 100 in a rotated final assembly position,
- a shaft portion 30 which supports the crossbar 20 and is oriented in the axial direction, for passing through corresponding apertures 110, 210 in the components 100, 200, and
- fastening means 40 for fastening the connector 1 to the first component 100 in a preassembly position,
wherein, in addition to the crossbar 20, the connector 1 has a rotation-blocking device 50 which is arranged between the crossbar 20 and the bearing collar 10 and is configured to block rotation of the connector 1 in relation to the first component 100 in the preassembly position and only to release said rotation when the connector 1 has moved from the preassembly position in the direction of the final assembly position, i.e. has pushed further here axially into the aperture 110 of the first component 100. The connector 1 here is produced integrally from plastic by means of an injection molding process. The configuration is such that the rotation-blocking device 50 has one or more, here two, approximately diametrically opposite, radially outwardly directed projections as blocking lugs 51.1, 51.2 on the shaft portion 30. The blocking lugs 51.1, 51.2 are arranged axially here between the crossbar and the bearing collar 10. The configuration is such that the fastening means 40 has at least one radially outwardly protruding upper latching projection 42.1, 42.2 and at least one radially outwardly protruding lower latching projection 43.1, 43.2 which is spaced apart axially therefrom, wherein the two latching projections 42.1, 42.2, 43.1, 43.2 are arranged between the bearing collar 10 and the crossbar 20, and wherein the one or more blocking lugs 51.1, 51.2 are at least partially arranged axially between the upper latching projection 42.1, 42.2 and the lower latching projection 43.1, 43.2. The fastening means 40 here have two upper and two lower latching projections 42.1, 42.2, 43.1, 43.2. The configuration is such that the upper latching projection 42.1, 42.2 and the lower latching projection 43.1, 43.2 are arranged on a substantially axially oriented skirt 41.1, 41.2 connected flexibly to the bearing collar 10 or to the shaft portion 30. The configuration is such that the connector 1 has two such skirts 41.1, 41.2, wherein the skirts 41.1, 41.2 are curved in the shape of a cylinder jacket on their radially outer side, and the two skirts 41.1, 41.2 lie on the same imaginary cylinder jacket, here approximately diametrically opposite each other, and wherein the blocking lugs 51.1, 51.2 are each arranged in the tangential direction between the skirts 41.1, 41.2.

Figure 1D:
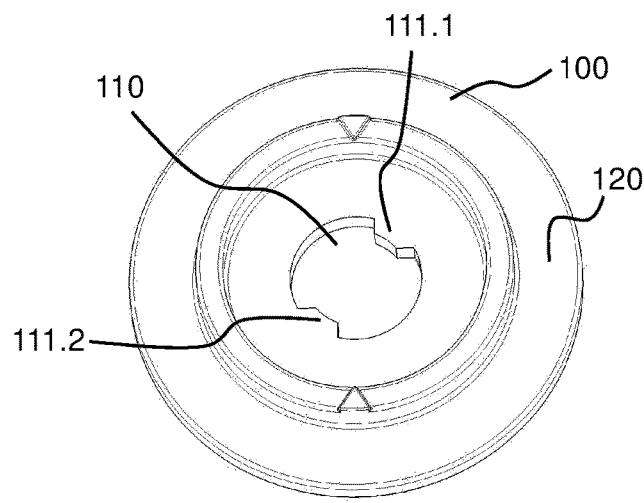
FIGS. 1D-1E show opening geometries of the first component (FIG. 1D) and of the second component (FIG. 1E)
Figure 1E:
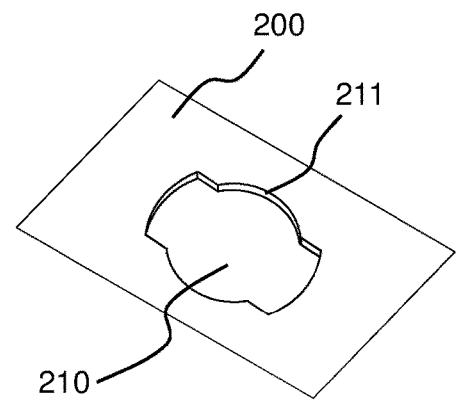

FIGS. 1D-1E show opening geometries of the first component (FIG. 1D) and of the second component (FIG. 1E).

Figure 2A:
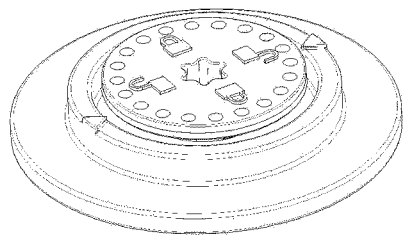
FIGS. 2A-2F show the connector according to the invention from FIGS. 1A-1C in the assembly (150) with the first component (100) from FIG. 1D in the preassembly position, in a perspective view (FIG. 2A), in a perspective half-sectional view (FIG. 2B), in sectional views in each case offset by 90° (FIGS. 2C, 2D) and from below (FIG. 2E) and also pressed in such that the rotation-blocking device releases the rotation, in a perspective view (FIG. 2F)
Figure 2B:
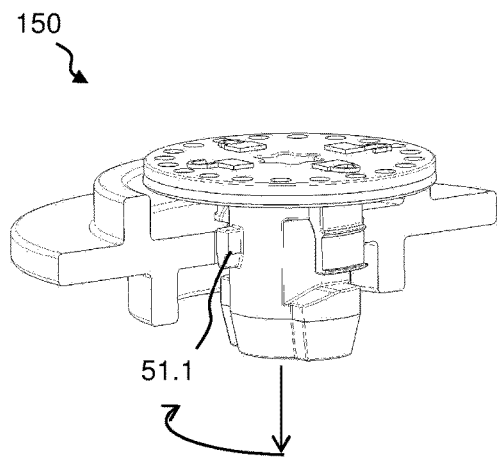
Figure 2C:
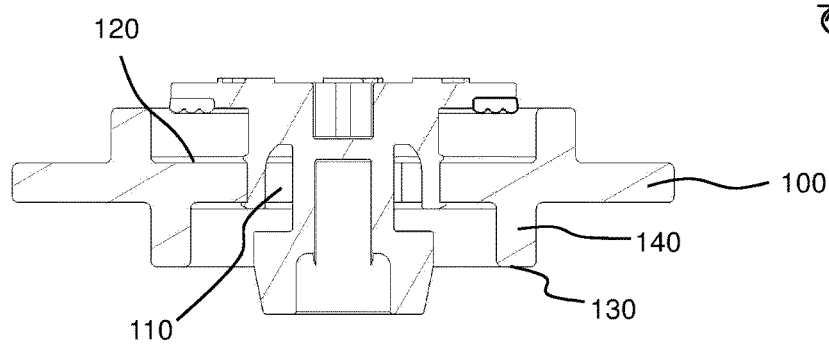
Figure 2D:
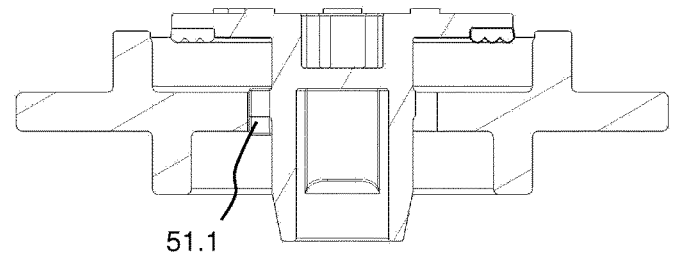
Figure 2E:
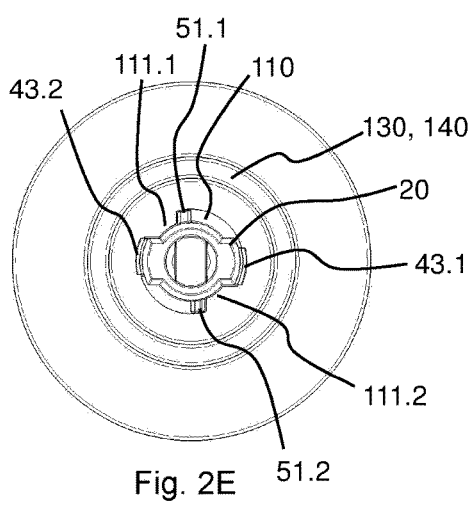
Figure 2F:
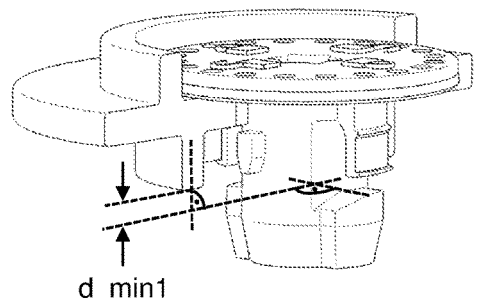

FIGS. 2A-2F show the connector according to the invention from FIGS. 1A-1C in the assembly 150 with the first component 100 from FIG. 1D in the preassembly position, in a perspective view (FIG. 2A), in a perspective semi-sectional view (FIG. 2B), in sectional views each offset by 90° (FIGS. 2C, 2D) and from below (FIG. 2E) and also pressed in such that the rotation-blocking device releases the rotation, in a perspective view (FIG. 2F). It is indicated in FIG. 2B with the aid of arrows which movement the connector carries out in order to pass into the final assembly position. The rotation-blocking device 50 is configured to only release the rotation of the connector 1 in relation to the first component 100 when the upper bearing surfaces 21.1, 21.2 of the crossbar 20 are arranged spaced apart at a certain axial minimum distance d_min1 of at least the material thickness D of the second component in relation to the lower bearing surface 130 of the first component 100. The configuration is such that the assembly comprises a first component 100 and a connector 1, which is mounted on the first component 100 in the preassembly position, according to the invention. When the connector 1 is in assembly with the first component 100 in the preassembly position, the skirts 41.1, 41.2 lie here within the aperture 110 of the first component 100 against the inner edge of the aperture, in a region at which the aperture is circular, and they therefore serve as a rotational guide. The configuration is such that the first component 100 has an aperture 110 at which the connector 1 is mounted by means of the fastening means 40, wherein the aperture 110 is circular in sections and has a plurality of radial indentations or bulges 111.1, 111.2 with which the rotation-blocking device 50 of the connector is in contact in order to block the rotation of the connector 1 in relation to the first component 100 in the preassembly position. The blocking lugs 51.1, 51.2 each lie here against an indentation 111.1, 111.2 of the aperture 110, and therefore the indentation 111.1, 111.2 forms a tangential stop for the blocking lug 51.1, 51.2. The rotational movement of the connector 1 in relation to the first component 100 is limited here in the preassembly position in one direction by the blocking lug 51.1, 51.2 lying against an indentation 111.1, 111.2, and in the other direction by a fastening means 40, here one of the skirts 41.1, 41.2. The configuration is such that the first component 100 has, outside the aperture 110, a collar 140 adjoining the aperture 110 on a lower side of the first component 100, wherein the axial lower end surfaces of the collar 140 constitute the lower stop surface 130 of the first component 100.

Figure 3A:
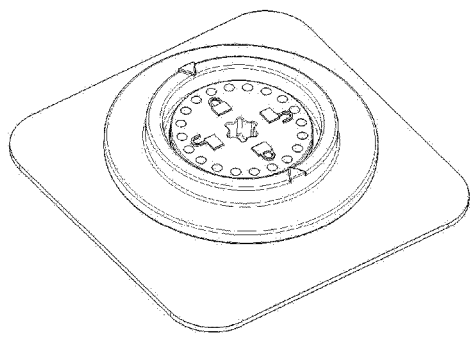
FIGS. 3A-3E show the connector according to the invention from FIGS. 1A-1C in the assembly (150) with the first component (100) from FIG. 1D and the second component (200) from FIG. 1E in the final assembly position, in a perspective view (FIG. 3A), perspective semi-sectional view (FIG. 3B), in sectional views each offset by 90° (FIGS. 3C, 3D) and obliquely from below (FIG. 3E)
Figure 3B:
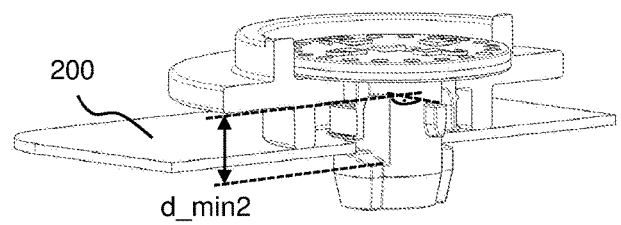
Figure 3C:
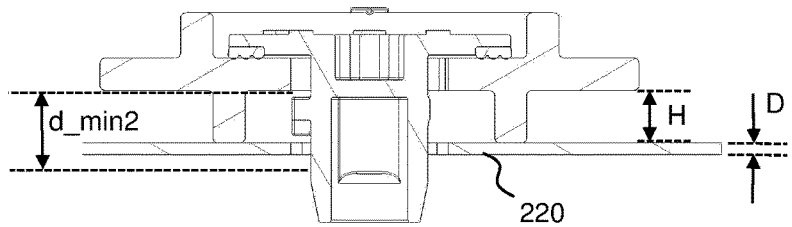
Figure 3D:
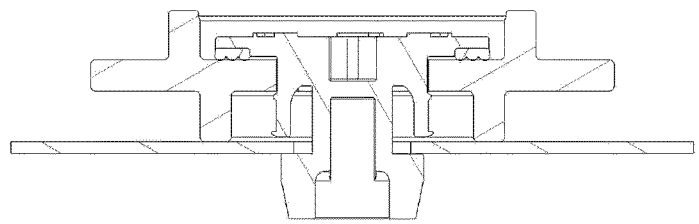
Figure 3E:
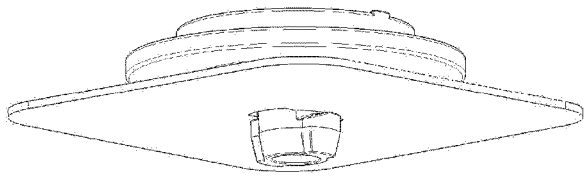

FIGS. 3A-3E show the connector according to the invention from FIGS. 1A-1C in the assembly 150 with the first component 100 from FIG. 1D and the second component 200 from FIG. 1E in the final assembly position, in a perspective view (FIG. 3A), a perspective semi-sectional view (FIG. 3B), in sectional views each offset by 90° (FIGS. 3C, 3D) and obliquely from below (FIG. 3E). In the final assembly position, the connector is rotated in relation to the first and second component in comparison to the preassembly position, here by 90°. The configuration is such that the assembly 150 is fastened to the second component 200, and the connector 1 is guided through the aperture 210 of the second component 200 and is rotated into the final assembly position such that the crossbar 20 is hooked behind a radial indentation 211 of the aperture 210 of the second component 200, wherein an axial distance d_min2 between firstly that point of upper ramp surfaces 22.1, 22.2 of the crossbar 20 which is furthest away from the bearing collar 10 and secondly an axial upper end of the blocking lugs 51.1, 51.2 is greater than the sum of the height H of the collar 140 and the thickness D of the second component 200 at the aperture 210 of the second component 200.

Figure 4A:
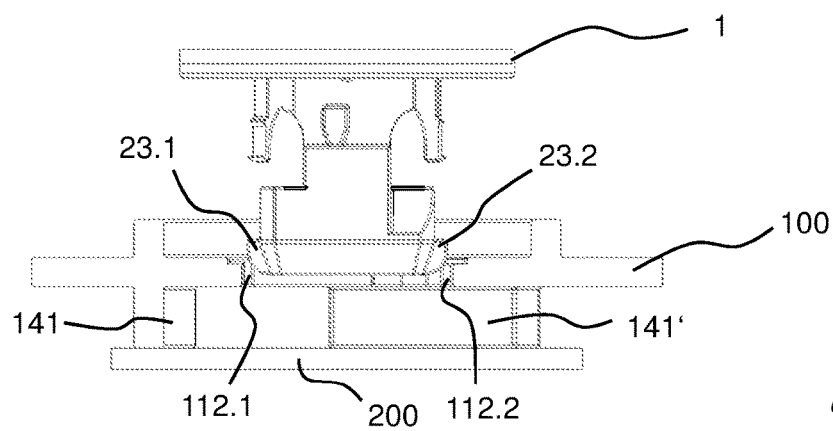
FIGS. 4A-4C show, on the basis of the connector and assembly, a further connector and assembly with erroneous insertion prevention and a rectangular aperture of the second component.
Figure 4B:
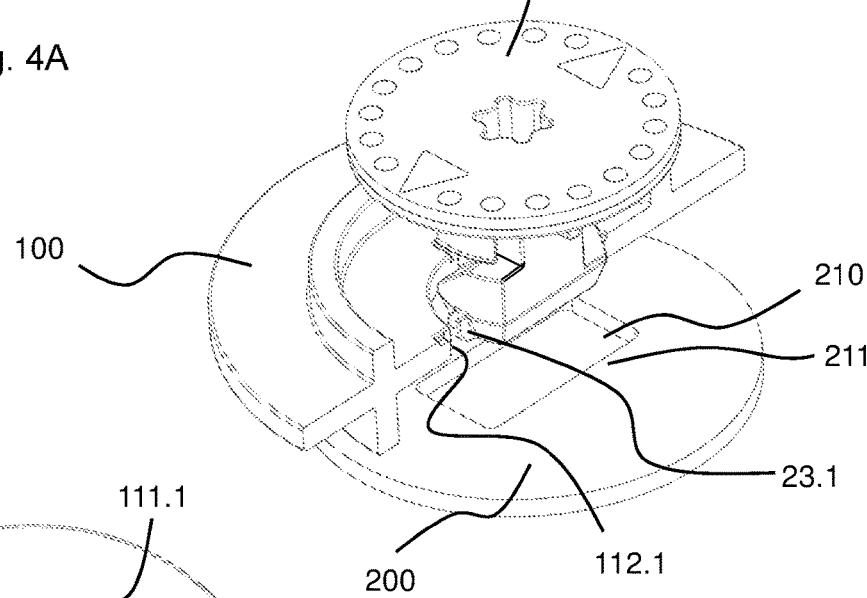
Figure 4C:
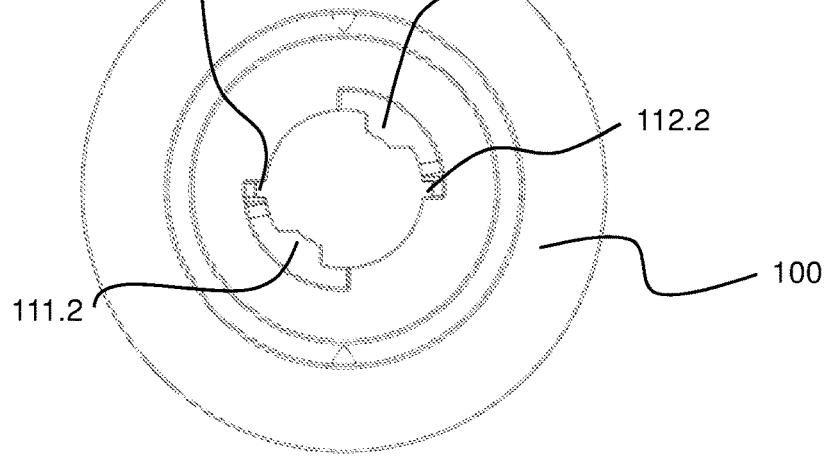

In FIGS. 4A-4C, the connector 1 in each case has a radial projection 23.1, 23.2 on two opposite radial outer walls of the crossbar, and the aperture 110 in the first component 100 has a corresponding radial recess 112.1, 112.2 such that the angular positions at which the crossbar 20 is insertable into the aperture 110 of the first component 100 are limited to at maximum two angular positions.

REFERENCE SIGNS 1 connector
10 bearing collar
20 crossbar
21.1 upper bearing surface
21.2 upper bearing surface
22.1 upper ramp surface of the crossbar
22.2 upper ramp surface of the crossbar
23.1 radial projection
23.2 radial projection
30 shaft portion
40 fastening means
41.1 skirt
41.2 skirt
42.1 upper latching projection
42.2 upper latching projection
43.1 lower latching projection 43.2 lower latching projection
50 rotation-blocking device
51.1 blocking lug
52.2 blocking lug
100 first component
110 aperture in the first component
111.1 indentation or bulge
111.2 indentation or bulge
112.1 radial recess
112.2 radial recess
120 upper side of the first component
130 lower bearing surface of the first component
140 collar
141 spacer
150 assembly
200 second component
210 aperture in the second component
211 indentation of the aperture in the second component
220 lower side of the second component
D thickness of the second component at the aperture
H height of the collar
d_min1 axial minimum distance from the upper bearing surfaces of the crossbar to the lower bearing surface of the first component
d_min2 distance between the upper end of the blocking lugs and the point furthest away from the upper ramp surfaces of the crossbar

What is claimed is:

1. A connector (1), wherein the connector (1) is configured to fasten a first component (100) to a second component (200) of a motor vehicle, wherein the connector (1) comprises:
an integrally molded plastic member that includes:
a bearing collar (10) for bearing against an upper side (120) of the first component (100),
a crossbar (20) having one or more upper bearing surfaces (21.1, 21.2) for bearing against a lower side (220) of the second component (200) and for bracing the second component (200) against a lower bearing surface (130) of the first component (100) in a rotated final assembly position,
a shaft portion (30) which supports the crossbar (20) and is oriented in the axial direction, for passing through corresponding apertures (110, 210) in the components (100, 200), and
fastening means (40) for fastening the connector (1) to the first component (100) in a preassembly position,
wherein, in addition to the crossbar (20), the connector (1) has a rotation-blocking device (50) which is arranged between the crossbar (20) and the bearing collar (10) and is configured to block rotation of the connector (1) in relation to the first component (100) in the preassembly position and only to release said rotation when the connector (1) has moved from the preassembly position in the direction of the final assembly position.

2. The connector (1) as claimed in claim 1, wherein the rotation-blocking device (50) is configured to only release the rotation of the connector (1) in relation to the first component (100) when the one or more upper bearing surfaces (21.1, 21.2) of the crossbar (20) are arranged spaced apart at a certain axial minimum distance (d_min1) of at least the material thickness (D) of the second component (200) or of at least 0.7 mm in relation to the lower bearing surface (130) of the first component (100).

3. The connector (1) as claimed in claim 1, wherein the rotation-blocking device (50) has one or more radially outwardly directed projections as blocking lugs (51.1, 51.2) on the shaft portion (30).

4. The connector (1) as claimed in claim 3, wherein the fastening means (40) has at least one radially outwardly protruding upper latching projection (42.1, 42.2) and at least one radially outwardly protruding lower latching projection (43.1, 43.2) which is spaced apart axially therefrom, wherein the two latching projections (42.1, 42.2, 43.1, 43.2) are arranged between the bearing collar (10) and the crossbar (20) and wherein the one or more blocking lugs (51.1, 51.2) are at least partially arranged axially between the upper latching projection (42.1, 42.2) and the lower latching projection (43.1, 43.2).

5. The connector (1) as claimed in claim 4, wherein the upper latching projection (42.1, 42.2) and the lower latching projection (43.1, 43.2) are arranged on a substantially axially oriented skirt (41.1, 41.2) connected flexibly to the bearing collar (10) or to the shaft portion (30).

6. The connector (1) as claimed in claim 5, wherein the connector (1) has at least two such skirts (41.1, 41.2), wherein the skirts (41.1, 41.2) are curved in the shape of a cylinder jacket on their radially outer side, and the two skirts (41.1, 41.2) lie on the same imaginary cylinder jacket, and wherein the blocking lugs (51.1, 51.2) are each arranged in the tangential direction between the skirts (41.1, 41.2).

7. An assembly (150), wherein the assembly comprises a first component (100) and a connector (1), which is mounted on the first component (100) in the preassembly position, as claimed in claim 3.

8. The assembly (150) as claimed in claim 7, wherein the first component (100) has an aperture (110) at which the connector (1) is mounted by means of the fastening means (40), wherein the aperture (110) is circular in sections and has one or more radial indentations or bulges (111.1, 111.2) with which the rotation-blocking device (50) of the connector is in contact or comes into contact in order to block the rotation of the connector (1) in relation to the first component (100) in the preassembly position.

9. The assembly (150) as claimed in claim 8, wherein the connector (1) has, on a radially outer wall of the crossbar, a radial projection (23.1, 23.2) or a radial recess, and wherein the aperture (110) in the first component (100) has a corresponding radial recess (112.1, 112.2) or a corresponding radial projection such that the angular positions by which the crossbar (20) is insertable into the aperture (110) of the first component (100) are limited to at maximum two angular positions.

10. The assembly (150) as claimed in claim 7, wherein the first component (100) has, outside the aperture (110), a collar (140) adjoining the aperture (110) or one or more spacers (141) on a lower side of the first component (100), wherein the axial lower end surfaces of the collar (140) or of the one or more spacers constitute the lower bearing surface (130) of the first component (100).

11. The assembly (150) as claimed in claim 7, wherein the assembly (150) is fastened to the second component (200), and the connector (1) is guided through the aperture (210) of the second component (200) and is rotated into the final assembly position such that the crossbar (20) is hooked behind a radial indentation (211) of the aperture (210) of the second component (200), wherein an axial distance (d_min2) between firstly the upper bearing surfaces (21.1, 21.2) or, if present, that point of upper ramp surfaces (22.1, 22.2) of the crossbar (20) which is furthest away from the bearing collar (10) and secondly an axial upper end of the blocking lugs (51.1, 51.2) is equal to or greater than the sum of the height (H) of the collar (140) or of the one or more spacers and the thickness (D) of the second component (200) at the aperture (210) of the second component (200).

12. A connector (1) for fastening a first component (100) to a second component (200) of a motor vehicle, the connector (1) comprising:
   a bearing collar (10) for bearing against an upper side (120) of the first component (100);
   a crossbar (20) having at least one bearing surface (21.1, 21.2) for bearing against a lower side (220) of the second component (200) and for bracing the second component (200) against a lower bearing surface (130) of the first component (100) when the connector is a final assembly rotational position relative to the first component and the second component;
   a shaft portion (30) supporting the crossbar (20), the shaft portion oriented in an axial direction, which runs from the bearing collar to the crossbar, for passing through corresponding apertures (110, 210) in the components (100, 200); and
   axially spaced apart projections for fastening the connector (1) to the first component (100) in a preassembly position in which the bearing collar (10) is spaced from the upper side (120) of the first component (100), wherein the axially spaced apart projections are axially spaced away from the bearing collar;
   wherein the connector (1) has a rotation-blocking device (50) positioned between the crossbar (20) and the bearing collar (10) and configured to block rotation of the connector (1) in relation to the first component (100) when the connector is in the preassembly position and only to permit rotation of the connector in relation to the first component when the connector (1) has moved a set axial distance in a direction that moves the bearing collar (10) toward the upper side (120) of the first component.

13. The connector (1) as claimed in claim 1, wherein the rotation-blocking device (50) is configured to only permit rotation of the connector (1) in relation to the first component (100) when the one or more upper bearing surfaces (21.1, 21.2) of the crossbar (20) are arranged spaced apart at a certain axial minimum distance (d_min1) of at least a material thickness (D) of the second component (200) or of at least 0.7 mm in relation to the lower bearing surface (130) of the first component (100).

14. The connector (1) as claimed in claim 12, wherein the rotation-blocking device (50) has one or more radially outwardly directed projections as blocking lugs (51.1, 51.2) on the shaft portion (30).

15. The connector (1) as claimed in claim 14, wherein the axially spaced apart projection include at least one radially outwardly protruding upper latching projection (42.1, 42.2) and at least one radially outwardly protruding lower latching projection (43.1, 43.2), wherein the upper and lower latching projections (42.1, 42.2, 43.1, 43.2) are arranged between the bearing collar (10) and the crossbar (20) and wherein the one or more blocking lugs (51.1, 51.2) are at least partially arranged axially between the upper latching projection (42.1, 42.2) and the lower latching projection (43.1, 43.2).

16. The connector (1) as claimed in claim 15, wherein the upper latching projection (42.1, 42.2) and the lower latching projection (43.1, 43.2) are arranged on a substantially axially oriented skirt (41.1, 41.2) connected flexibly to the bearing collar (10) or to the shaft portion (30).

17. An assembly (150), wherein the assembly comprises a first component (100) and a connector (1), which is mounted on the first component (100) in the preassembly position, as claimed in claim 12.

18. A connector (1), wherein the connector (1) is configured to fasten a first component (100) to a second component (200) of a motor vehicle, wherein the connector (1) comprises
   a bearing collar (10) for bearing against an upper side (120) of the first component (100),
   a crossbar (20) having one or more upper bearing surfaces (21.1, 21.2) for bearing against a lower side (220) of the second component (200) and for bracing the second component (200) against a lower bearing surface (130) of the first component (100) in a rotated final assembly position,
   a shaft portion (30) which supports the crossbar (20) and is oriented in the axial direction, for passing through corresponding apertures (110, 210) in the components (100, 200), and
   fastening means (40) for fastening the connector (1) to the first component (100) in a preassembly position,
   wherein the fastening means (40) has at least one radially outwardly protruding upper latching projection (42.1, 42.2) and at least one radially outwardly protruding lower latching projection (43.1, 43.2) which is spaced apart axially from the upper latching projection (42.1, 42.2), wherein the two latching projections (42.1, 42.2, 43.1, 43.2) are arranged between the bearing collar (10) and the crossbar (20) and wherein the one or more blocking lugs (51.1, 51.2) are at least partially arranged axially between the upper latching projection (42.1, 42.2) and the lower latching projection (43.1, 43.2).

* * * * *